(12) United States Patent
Crutcher

(10) Patent No.: US 6,446,385 B1
(45) Date of Patent: Sep. 10, 2002

(54) GREENHOUSE SYSTEM WITH CO-GENERATION POWER SUPPLY, HEATING AND EXHAUST GAS FERTILIZATION

(76) Inventor: William C. Crutcher, Munson Rd., Middlebury, CT (US) 06762

( * ) Notice: Subject to any disclaimer, the term of this patent is extended or adjusted under 35 U.S.C. 154(b) by 0 days.

(21) Appl. No.: 09/681,829

(22) Filed: Jun. 12, 2001

(51) Int. Cl.[7] .............................................. A01G 9/00
(52) U.S. Cl. .......................................... 47/17; 47/58.1
(58) Field of Search ..................... 47/17, 58.1; 405/129

(56) References Cited

U.S. PATENT DOCUMENTS

| | | | | |
|---|---|---|---|---|
| 4,166,339 A | * | 9/1979 | Heller et al. | .................... 47/17 |
| 5,713,154 A | * | 2/1998 | Goldstein et al. | .............. 47/17 |
| 5,747,042 A | * | 5/1998 | Choquet | .................. 424/195.1 |
| 6,205,704 B1 | * | 3/2001 | Schmitz et al. | ................. 47/17 |

FOREIGN PATENT DOCUMENTS

| | | | | |
|---|---|---|---|---|
| EP | 0858985 A2 | * | 10/1997 | ............. C05C/5/04 |
| FR | 2575633 A1 | * | 7/1986 | ............ A01G/9/24 |
| JP | 401211435 A | * | 8/1989 | ............ A01G/9/24 |

OTHER PUBLICATIONS

Emerging Technologies for the Management and Utilization of Landfill Gas, by Roe et al, E.H. Pechan & Associates, U.S. EPA, Jan. 1998, pp. 46, 47, and 48.*

* cited by examiner

Primary Examiner—Peter M. Poon
Assistant Examiner—Andrea M. Valenti
(74) Attorney, Agent, or Firm—William C. Crutcher

(57) ABSTRACT

A greenhouse is combined with a gas turbine generator set, wherein power, heat and fertilization products are all supplied to the greenhouse by the gas turbine and its exhaust gas in a balanced system for year-round continuous plant production. The system is preferably located at a landfill along with other similar units and is fueled by landfill gas. Excess power from the gas turbine generator in summer months is sold to the electric utility grid as "green power".

18 Claims, 2 Drawing Sheets

GREENHOUSE SYSTEM WITH CO-GENERATION POWER SUPPLY, HEATING AND EXHAUST GAS FERTILIZATION

BACKGROUND OF INVENTION

This invention relates to the field of agricultural and horticultural production in greenhouses, and more particularly to greenhouses adapted for uninterrupted year round production, having an independent fuel source for heating, and exhaust gas fertilization. The invention also relates to the field of co-generation of electrical power for artificial lighting, and other power needs of a greenhouse, as well as for providing heat in the wintertime for the greenhouse and excess electrical power to the grid in the summertime.

Greenhouses have been designed to extend the growing season and to enhance plant growth. Enhancement techniques have included the use of programmed artificial lighting, hydroponic systems for root support and feeding of nutrients, enrichment of the air in the greenhouse enclosure with $CO_2$, heating the greenhouse in cold weather, cooling it in hot weather, and using computers to control the environment to suit the type of plant being grown.

The cost of energy required to support a year round greenhouse is significant, especially in a cold climate. Proposals have been made to use methane-rich landfill gas as an energy source, both because of its lower cost and because of the beneficial environmental effects of removing methane from otherwise escaping into the atmosphere, where it is known to harm the ozone layer.

U.S. Pat. No. 6,205,704, issued Mar. 27, 2001 to Schmitz et al describes a method and apparatus for an environmentally controlled greenhouse located near a landfill site, comprising collecting landfill gas (LFG) from the landfill, transporting the landfill gas, distributing a first LFG portion of the landfill gas to a combustion system, heating a heat exchange fluid with the products of combustion, and controlling the temperature of growing plants in the greenhouse with the heat exchange fluid, distributing a second LFG portion of the landfill gas to a $CO_2$ system, where the non-methane hydrocarbons (NMO) and reduced sulfur compounds (TRS) are adsorbed from the LFG prior to a controlled combustion which removes methane and generates a clean $CO_2$ system product gas (CSPG), conducting the CSPG to the greenhouse enclosure, and selectively controlling the temperature and the carbon dioxide level in the greenhouse. In a preferred embodiment, a portion of the $CO_2$ system product is mixed with air and used to regenerate dual-connected adsorber beds used to remove the NMO's from the second LFG portion. A modified system interposes a turbine generator to recover additional energy from the combustion of the first LFG portion and uses steam extracted from the turbine to heat the greenhouse. The Schmitz patent uses a centralized LFG collection system for the landfill, in which all of the LFG is transported to a central collection point and divided into separate portions for heating and $CO_2$ fertilization purposes.

Small gas turbine generators have been developed, which generate electrical power for either stand alone distributed power, or for connection to the electrical power grid. The hot exhaust gases are directly usable for various co-generation purposes, such as water or air heating, absorption cooling, or industrial uses requiring heat. Gas turbine exhaust with low emission ratings of NOx has been successfully used to heat greenhouses by a MicroTurbine™ (trademark of the Capstone Turbine Corporation) by exhausting the gas directly into the greenhouse.

SUMMARY OF INVENTION

Briefly stated, the invention comprises a greenhouse system with co-generation power supply, heating, and exhaust gas fertilization for operation with a source of hydrocarbon fuel, the greenhouse system comprising a gas turbine connected to the fuel source providing a hot exhaust gas containing $CO_2$, NOx and SOx, an electric generator driven by the gas turbine, a greenhouse for growing plants and utilizing a number of power consuming devices supplied by the electric generator, a heat exchange system for heating the greenhouse with the hot exhaust gas, an exhaust gas treatment system receiving the hot exhaust gas, and a fertilization system for fertilizing the plants with the products from the gas treatment system.

In a preferred embodiment, a number of such greenhouse systems are located on a landfill site generating landfill gas (LFG) containing methane and $CO_2$, where the source of the fuel for the gas turbines is LFG from individual wells drilled in the landfill. The generators are connected to service the power consuming devices of their respective greenhouses. They are also provided with an interconnection to the electrical grid maintained by the utility company, so as to enable supply of excess power to the grid and to receive power from the grid. In the preferred embodiment, the gas treatment system cleans the gas for direct $CO_2$ fertilization. The NOx and SOx from the treated gas are converted and react with other substances in a fertilizer conversion system to provide fertilizer for enhancing growth of the greenhouse plants.

BRIEF DESCRIPTION OF DRAWINGS

The invention will be better understood by reference to the following description, taken in connection with the accompanying drawings, in which.

DETAILED DESCRIPTION

Figure 1:
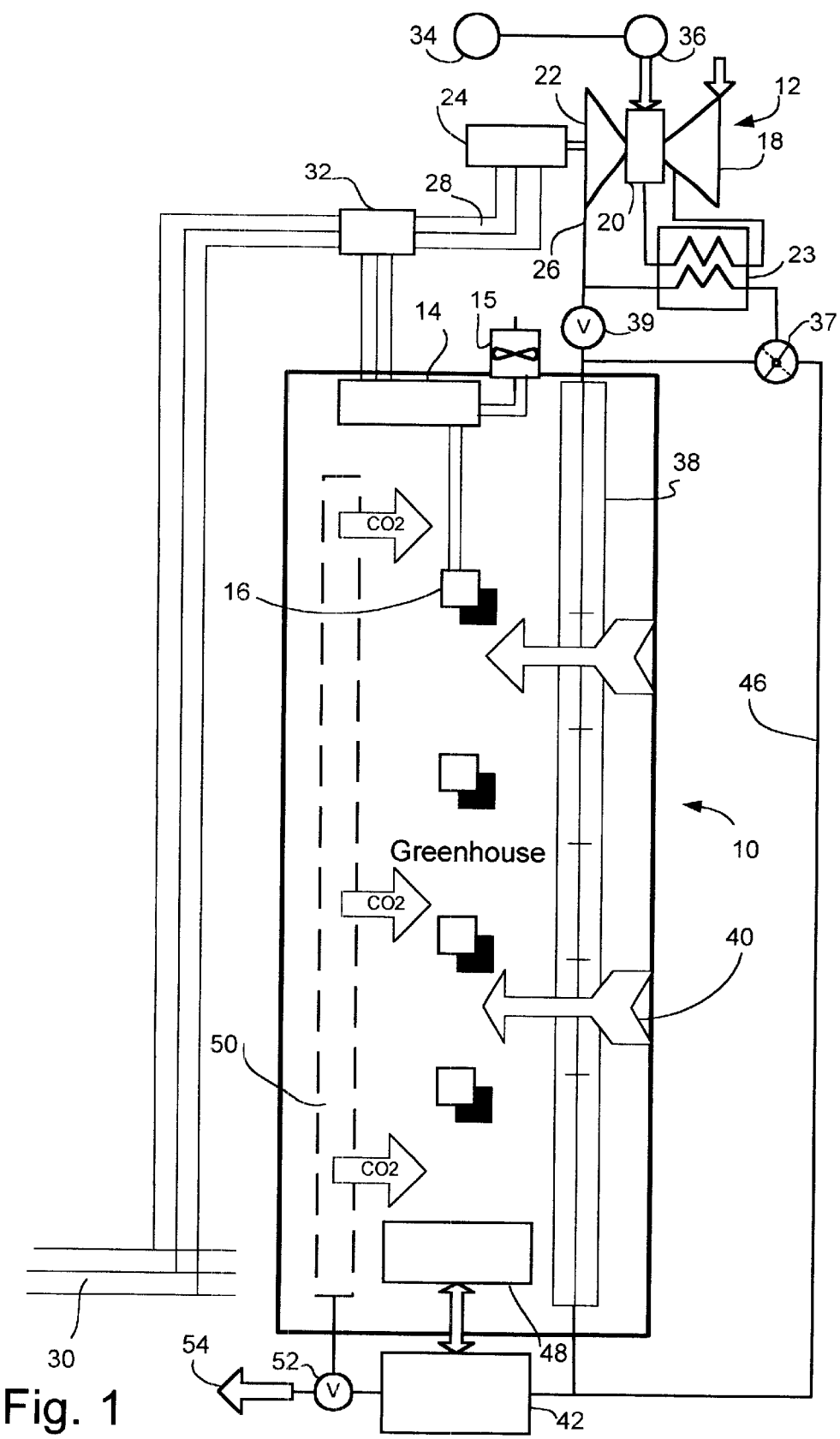
FIG. 1 is a simplified schematic plan view of a greenhouse system according to the present invention.

Referring to FIG. 1 of the drawing, a greenhouse shown generally as 10 is heated and powered by an adjacent gas turbine generator unit shown generally as 12. The greenhouse 10 contains the conventional facilities for growing any desired type of horticultural or agricultural products. This includes passive equipment, such as plant stands and root support systems, as well as active power consuming equipment generally required in a commercial greenhouse, such as ventilating fans, air circulation fans, automatic shade screens, evaporative cooling system, water supply equipment with pumps, general lighting, power supply for computers, clocks and timers, vent operating motors, supplied from a general electrical supply switchbox shown as 14. These power consuming devices are not shown, but are collectively represented in the drawing by an exhaust fan 15. An additional major element of power consuming equipment comprises artificial light lamps 16, which are preferably high-pressure sodium (HPS) lights. The remaining power consuming devices are not shown, so as not to obscure the invention.

The gas turbine generator unit 12 includes an air compressor 18, which can be either axial or centrifugal flow, a combustion chamber 20 designed to burn gaseous fuel, and a turbine 22. Compressed air from compressor 18 is preheated in a recuperator 23 before entering the combustion chamber 20. The compressor 18 and turbine 22 are connected on the same shaft to an electrical generator 24. Turbine 22 produces the power for the compressor 18 and generator 24 and exhausts hot gas at 26, which preheats compressor air in the recuperator 23. Generator 24 provides a regulated alternating current output via lines 28 to switchbox 14 to be selectively connected to the power consuming devices, represented by exhaust fan 15 and the supplemental lighting lamps 16. The greenhouse and power generator are sized and designed to balance to power needs and heating needs of the greenhouse under the most demanding environmental conditions, as will be explained later in detail. In the event that the power generation and heating system is inadequate, additional power and heat will be required. On the other hand, operating conditions at other times, particularly during the summer months, will not require the full capability of the power generation system, and excess power will be available. A conventional electrical grid 30 maintained by the electric utility serves to supply or absorb such net power. Provision for connecting the net output of generator 24 to the electrical grid 30 is indicated by automatic interconnection control switch 32.

A suitable gas turbine generator for the unit indicated at 12 is manufactured by Capstone Turbine Corporation as Model 330, which is capable of generating full load power of 30 kW at 400–480 VAC, 50/60 cycles. The combustion system 20 includes a modified fuel gas flow control valve enabling the standard Model 330 to burn LFG directly, which has a heat value of approximately one half that of natural gas. Capstone Model 330 may be obtained either as a recuperated unit with a recuperator represented by recuperator 23 fully integrated, or as a non-recuperated unit. Capstone Turbine also manufactures a Dual Mode Controller that is integrated with its generator output and is suitable for the automatic interconnection control switch 32.

In accordance with one aspect of the invention, the greenhouse 10 and the gas turbine generator 12 are located adjacent one another and also adjacent a vertical well 34 drilled into an underlying landfill. if the gas turbine generator is suitably designed, it may alternatively be located inside the greenhouse or in an enclosure attached to the greenhouse. A fuel pump 36 extracts and pressurizes LFG from well 34 to a pressure level suitable for introduction into the combustion system 20. Air for the combustion process may be preheated by recuperator 23 before it is supplied to the combustion chamber 20 by compressor 18, where the LFG is combusted. After burning the LFG in the combustion chamber, the products of combustion flow though turbine 22 and are discharged to the exhaust duct 26. The exhaust gas is directed to recuperator 23 to preheat the air and then flows through a two position butterfly valve 37 to a heat exchange system 38. Recuperator 23 may be partially or completely by-passed by a by-pass valve 39 to raise the heat energy in the hot gas supplied to the heat exchange system 38. By-passing the recuperator decreases the efficiency of the gas turbine generator 12, but increases the heat supplied to heat the greenhouse in extremely cold weather.

The exhaust gas is rich in $CO_2$, having been augmented by the $CO_2$ in the landfill gas. Any excess oxygen combines with nitrogen in complicated fashion to yield undesirable air pollutant $NO_x$. The exhaust gas also contains SOx, as a result of $H_2S$ in the LFG, which is generally recognized to be harmful to plant growth.

The heat exchange system 38 inside the greenhouse, may be of any conventional type, including steam or hot water, and is depicted in the drawing as a closed conduit with extended surface, such as fins, to facilitate heating the air inside the greenhouse. Alternatively, the heat exchange system may comprise a boiler for heating hot water with the exhaust gas, and circulating the hot water through finned tubing throughout the greenhouse. A suitable integrated co-generation package consisting of the aforementioned Capstone gas turbine generator and a vacuum type waste heat recovery heat exchanger is commercially available from Takuma Company as a TCP-30 system designed to operate with a Capstone turbine generator burning natural gas. The details of the heat exchange system 38 are not material to the present invention; the heat exchange process is indicated symbolically by arrows 40. Conventional fans and blowers (not shown) serve to circulate the heated air throughout the greenhouse, and may comprise fans oriented to provide a horizontal re-circulating flow pattern to uniformly distribute the heat.

The exhaust gas, which has been cooled in heat exchange system 38 to a temperature approaching the saturation temperature of the $H_2O$ in the exhaust, is conducted to an exhaust gas treatment system 42, where NOx and SOx are reduced to acceptable levels for discharge of the exhaust gas directly into the greenhouse. The butterfly valve 37 allows the hot exhaust gas to be diverted from the heat exchange system through a conduit 46 to the gas treatment system 42.

According to one aspect of the invention, the NOx and SOx are converted into nutrients which are then used to feed the plants in the greenhouse in a fertilizer conversion system, indicated generally at 48. A number of systems have been proposed for reducing the levels of NOx and/or SOx in flue gases and capturing some of the by-products of the process for use to produce fertilizer. However, none of these proposals have suggested a direct conversion from the pollutants in gas turbine exhaust gases to fertilizer for greenhouse plants, which also benefit from the electric power and heat supplied by the gas turbine generator to the greenhouse.

One suitable arrangement for the gas treatment system 42 and the fertilizer conversion system 48 is disclosed in European Patent Application No. 97117779.5 filed Oct. 14, 1997 in the name of Dravo Lime Co. and published as EP 0 858 985 A2 on Aug. 19, 1998, the disclosure of which is incorporated herein by reference. There a fertilizer composition containing an alkaline earth nitrate, such as calcium nitrate or magnesium nitrate is produced by the scrubbing of hot combustion gases so as to remove sulfur dioxide and nitrogen oxides from the gas. After removal of sulfur dioxide from a gas stream, a humidified gas stream containing NOx is treated to convert the NOx to nitric acid, and the nitric acid-containing humidified gas stream is contacted with an alkaline earth compound which reacts with the nitric acid to form an alkaline earth nitrate in an aqueous effluent, which effluent comprises a fertilizer composition. The preferred method used in the above-described patent application to convert NOx to nitric acid is a corona discharge apparatus. A suitable corona discharge unit for generating ozone is disclosed in U.S. Pat. No. 6,165,423 issued Dec. 26, 2000 to Crosbie, that is incorporated herein by reference. The power for the corona discharge device is supplied by the generator 24 via transformer and wiring (not shown) from switchbox 14.

The fertilizer effluent produced from the treated exhaust gas is transported from the fertilizer conversion system 48, whence it is distributed to the substrate holding the root systems of the plants in the greenhouse. The fertilizer may be injected into the conventional water irrigation supply piping systems (not shown) or by manual application. Alternatively, an ebb-and flood system is used in which a mixture of fertilizer effluent and water are periodically pumped into watertight trays on benches holding potted plants, and then drained back into a holding tank. If the greenhouse is growing plants hydroponically in soil-less substrate in trays containing water, the effluent may conveniently be pumped through the trays to feed and fertilize the plants. The method of applying the fertilizer to the plants is not material to the present invention.

Another system useful for the gas treatment system 42 and fertilizer conversion system 48 is disclosed in published European Patent Application 00302031.0 filed Mar. 14, 2000 in the name of Cannon Technology, Inc. and published as EP 1 040 863 A2 on Oct. 4, 2000, which disclosure is incorporated herein by reference. This treatment system is similar to that in EP 0 858 985 A2, except that the NOx is converted to higher order nitric oxides by the addition of ozone at a pre-selected molar ratio for a pre-selected residence time.

The treated exhaust gas leaving gas treatment system 42 is rich in $CO_2$, with NOx and SOx removed or reduced to acceptable levels, such pollutants being harmful to humans and the SOx being particularly harmful to plant growth. The treated exhaust gas is conducted into a $CO_2$ distribution system 50. A by-pass valve 52 allows discharge directly to the atmosphere though a stack at 54. The $CO_2$ distribution system 50 is a conduit with openings distributed along its length to allow escape of the gas for $CO_2$ fertilization of the plants in the well known photosynthesis reaction, $$6CO_2 + 6H_2O + light \Rightarrow C_2H_{12}O_6 + 6H_2O$$

wherein the light for the metabolic process is sunlight during sunny days, or artificial light from supplemental artificial lamps 16 during cloudy days or at night, as desired. The $CO_2$ level is monitored and controlled with the by-pass valve 52 to raise the level from the normal 300 ppm in the atmosphere to a level of 1200 to 1500 ppm inside the greenhouse at times when photosynthesis may take place most rapidly, i.e. while the visible light energy levels are highest.

Fertilizer conversion system 48 and $CO_2$ distribution system 50 together comprise a fertilization system using the treated gas from gas treatment system 42 to fertilize the plants in the greenhouse.

A computerized control system (not shown) is programmed to continuously control the growing environment of the greenhouse in accordance with the type of plants being grown. The temperature is controlled by operating the gas turbine exhaust valves 37, 39 and conventional exhaust fans, vents, cooling system The CO2 level is controlled by by-pass valve 52 and the conventional exhaust fans and vents. Fertilizer is added on a programmed schedule, such as by the computerized control system shown in the aforementioned Schmitz et al U.S. Pat. No. 6,205,704, which is incorporated herein by reference. Environmental control systems $CO_2$ fertilization using propane or natural gas units, nutrient supply systems and conventional greenhouse supplemental lighting, heating, cooling, and ventilation systems are fully described in "Greenhouse Operation and Management", Fifth Edition, by Paul V. Nelson, (Prentice Hall, 1998), which is incorporated herein by reference.

The greenhouse system described in FIG. 1 is appropriate for small retail greenhouses in commercial areas when using natural gas as a fuel. Because it is independently powered and heated by the gas turbine generator and receives nutrients from the byproducts of combustion, the greenhouse can be operated more economically than if all of the things necessary to enhance plant growth had to be purchased on the open market. The greenhouse system becomes particularly attractive in cold climates, since it enables a year round growing season.

Figure 2:
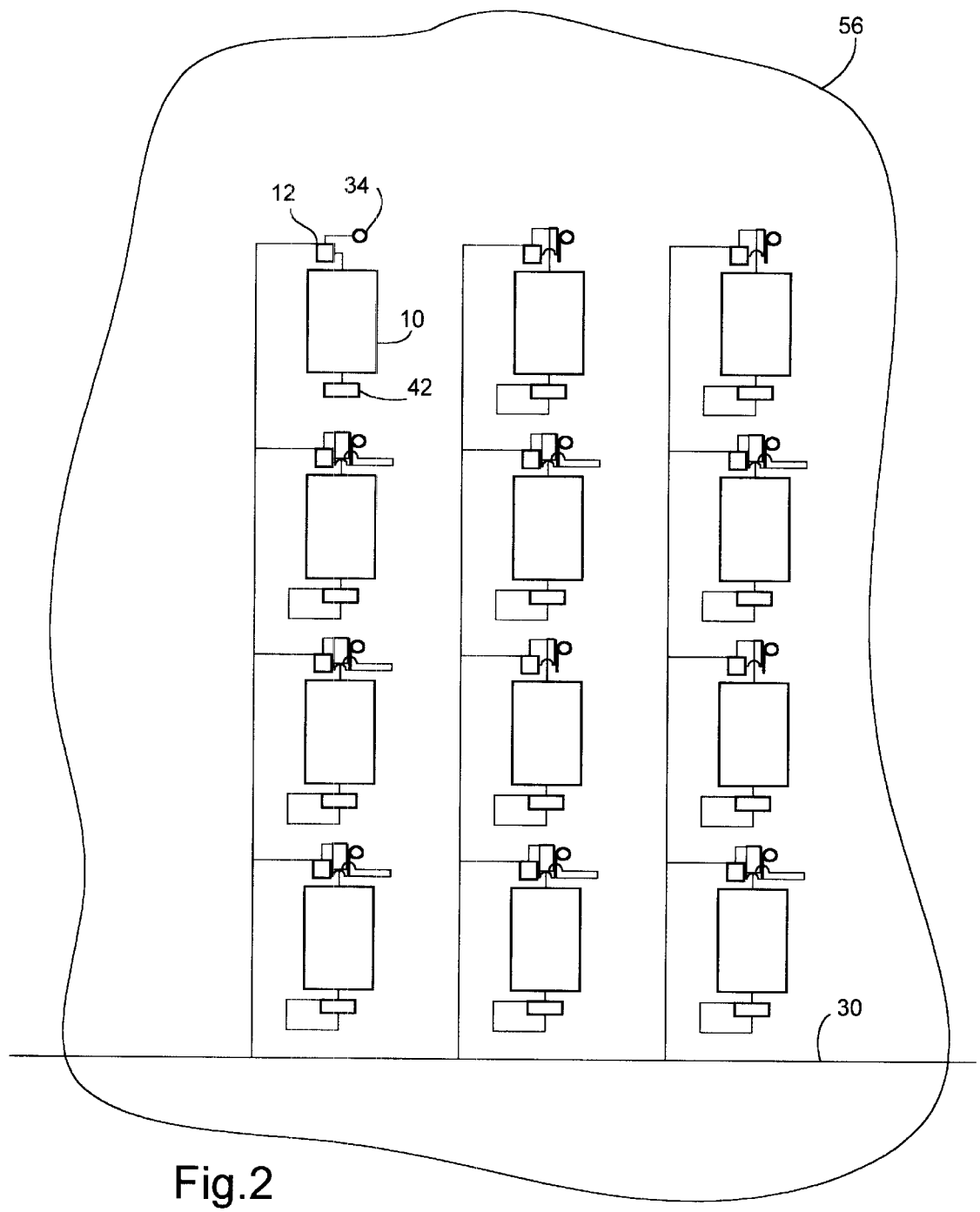
FIG. 2 is a simplified schematic plan view of a landfill having a group of the greenhouse systems disposed thereon.

Even more economical greenhouse production and utilization of otherwise wasted resources may be obtained by using landfill gas, digester gas or other waste gases having low heating value and possible contaminants. A preferred embodiment of the invention is illustrated in FIG. 2, wherein a group of the greenhouse systems are disposed on a landfill 56 containing municipal solid waste (MSW). The gas turbine generators 12, greenhouses 10, gas treatment systems 42 are as previously described in FIG. 1, but shown in simplified form and not to scale. The generators are provided with interconnections to the electrical grid 30. Grid 30 is maintained by the electric utility company, as previously described.

Vertical wells 34 are distributed over the landfill 56, which has been capped and closed to further deposits of MSW. Solid waste is composed of inert materials, such as metals and glass, and decomposable organic matter, such as paper and food waste. The organic fraction of the solid waste undergoes anaerobic microbial decomposition in a sanitary landfill. The products of anaerobic microbial metabolism include water, methane, carbon dioxide, and low levels of other compounds that can migrate into surrounding soils or emit to the atmosphere if not controlled otherwise. The gaseous products of decomposition (i.e. LFG) consist predominantly of methane and carbon dioxide.

LFG production at landfills continues for many years. The rate and life of LFG production is dependent upon many site specific factors, including solid waste moisture content and composition, pH and temperature. LFG is an attractive potential energy source due to its production life and the presence of significant amounts of methane. Typical LFG compositions include 40 to 60 percent methane, which equates to a lower heating value of approximately 360 to 540 British Thermal Units (Btu) per standard cubic foot (scf). Pipeline quality natural gas, which is approximately 100 percent methane, has a lower heating value of about 900 Btu/scf. Landfill 56 may be expected to generate landfill gas (LFG) over twenty years or more.

Typically LFG contains 40%–60% $CH_4$, 30%–45% $CO_2$, 1%–3% $O_2$, 3%–10% $N_2$, by volume, and various trace impurities. The heating value of LFG is approximately 500 BTU/scf, which varies according to the percentage of methane in the LFG. Assuming that air is 21% oxygen and that the remaining gases are the equivalent of nitrogen, the basic reaction equation for the complete combustion of methane with no excess air is:

$$CH_4 + 2O_2 + 7.52N_2 \Rightarrow CO_2 + 2H_2O + 7.52N_2$$

Assuming landfill gas to be 50% methane, 40% $CO_2$ and that the other gases are the equivalent of 10% $N_2$, the reaction equation for complete combustion of landfill gas is:

$$CH_4 + 2O_2 + 0.8CO_2 + 7.72N_2 \Rightarrow 1.8CO_2 + 2H_2O + 7.72N_2$$

The usual type of LFG recovery system for a MSW landfill consists of drilling vertical extraction wells, connecting them together by horizontal pipelines and leading the pipelines to a central LFG collection point adjacent the landfill. A user of the landfill gas, such as a large greenhouse as envisioned by the aforementioned Schmitz patent, may obtain the benefits of the collected gas, if it is located within one or two miles of the landfill. A significant part of the cost of the LFG collection system is in the horizontal pipelines connecting the vertical extraction wells and leading the LFG to a central collection point.

In accordance with the preferred embodiment of the invention, the vertical wells 34 are distributed at intervals such that the anticipated reliable flow of LFG obtainable from a well 34 is sufficient to power its associated gas turbine generator 12 at full load. The greenhouse 10 is then sized to match the exhaust heat available from the gas turbine generator 12 at the expected wintertime temperatures requiring heat in the greenhouse against the heat loss through the walls and roof of the greenhouse. The power consuming devices, including supplemental lighting are then selected to utilize the electrical power output available from the gas turbine generator. Depending upon the plants to be grown, the fertilizer conversion system 48 is designed to provide appropriate chemical compounds from by-products of the treated exhaust gas for fertilization of the type of plants to be grown.

The number of greenhouse systems depends upon the size of the landfill, and the use of the invention is particularly appropriate for small landfills, which would otherwise be uneconomical to develop with conventional LFG collection systems Contrary to a fuel source that is used only as needed because of cost, LFG is generated continuously and is wasted if not used. The most critical environmental condition that threatens plants in a year-round greenhouse is cold temperature. If the greenhouse is to operate year-round, heaters are required using expensive natural gas or propane. The greenhouse construction determines rate of heat loss and is designed to be of a size where its heat loss at the coldest expected temperature is balanced by the heat energy in the gas turbine exhaust gas supplied to the heat exchange system, taking into account the efficiency of the heat exchange system. While the gas turbine overall efficiency is lower in the non-recuperated mode (i.e. by-passing the recuperator), this mode produces a higher heat content in the exhaust gas and enables a larger area greenhouse to be heated.

During winter operation, the heat exchange system is employed. Extreme temperatures are only rarely encountered; hence the-gas turbine is usually operated in the more efficient recuperated mode. The heat energy in the turbine exhaust gas will normally be sufficient for wintertime operation to keep the greenhouse at desired temperatures. The supplemental lighting units are operated on sunless days, and the $CO_2$ distribution system is activated to raise the carbon dioxide level to 1500 ppm during the times when light from sunlight or artificial lighting is most intense, in order to enhance photosynthesis in the plants. Fertilizer from the products of the gas turbine exhaust is periodically applied. Power needs of the greenhouse will be expected to utilize the full power output of the generator During summer operation, when heating is not required, the exhaust gas is directed by the butterfly valve directly to the gas treatment system. It may alternatively be used in a cooling system (not shown). However, the invention contemplates that the turbine generator operates at full load using all of the LFG available from the vertical extraction well. Summertime operation will result in excess power availability after the power consuming devices used in operation of the greenhouse are satisfied. The excess electrical power from the generator not needed for operation of the greenhouse is supplied to the electrical energy power grid through the automatic interconnection control switch. Since the energy comes from a renewable energy source, i.e decomposition of MSW in a landfill, it may be sold advantageously under special rules and regulations applicable to deregulated electrical energy generation, depending upon the location of the landfill. Since summertime is also the time when the need for electrical energy from the power grid is the greatest, and and there is no need for heating the greenhouse, the invention produces a synergistic economic and environmental benefit. The atmospheric environment is improved by removal of harmful methane generated at smaller landfills, in which installation of centralized LFG collection systems would otherwise be uneconomical.

While there has been disclosed what is considered to be the preferred embodiment of the invention, other modifications will occur to those skilled in the art, and it is desired to include all such modifications as fall within the true spirit and scope of the invention.

What is claimed is:

1. A greenhouse system with co-generation power supply, heating, and exhaust gas fertilization for operation with a source of hydrocarbon fuel, said greenhouse system comprising:

a gas turbine connected to said source and discharging a hot exhaust gas containing $CO_2$, NOx and SOx, an electric generator driven by the gas turbine, a greenhouse for growing plants, a plurality of power consuming devices in the greenhouse supplied by the electric generator, a heat exchange system for heating the greenhouse with the hot exhaust gas, an exhaust gas treatment system receiving the hot exhaust gas, and a fertilization system for fertilizing the plants with the products from the exhaust gas treatment system.

2. The combination according to claim 1, wherein the fertilization system comprises a $CO_2$ distribution system inside the greenhouse and first valve means for periodically conducting treated exhaust gas to said $CO_2$ distribution system.

3. The combination according to claim 1, wherein the fertilization system comprises a fertilizer conversion system arranged to convert NOx from the exhaust gas into plant fertilizer.

4. The combination according to claim 1, wherein the fertilization system comprises a fertilizer conversion system arranged to convert SOx from the exhaust gas into plant fertilizer.

5. The combination according to claim 1, wherein said greenhouse system is located in close proximity to a landfill generating landfill gas (LFG) containing methane and $CO_2$, and the source of the hydrocarbon fuel for the gas turbines is methane in the LFG from the landfill.

6. The combination according to claim 1, and further including an automatic interconnection control switch connected to the generator for selectively connecting the generator either to the power consuming devices or to an external electrical grid so as to enable supply of excess power to the grid or to receive power from the grid.

7. The combination according to claim 1, wherein the power consuming devices include supplemental artificial lighting lamps for enhancing plant growth.

8. A greenhouse system with co-generation power supply, heating, and exhaust gas fertilization located in close proximity to a landfill providing a source of landfill gas (LFG) containing methane and $CO_2$, said greenhouse system comprising:

a gas turbine connected to said source and discharging a hot exhaust gas containing $CO_2$, NOx and SOx, an electric generator driven by the gas turbine, a greenhouse for growing plants, a plurality of power consuming devices in the greenhouse supplied by the electric generator, a heat exchange system for heating the greenhouse with the hot exhaust gas, an exhaust gas treatment system receiving the hot exhaust gas, and a fertilization system for fertilizing the plants with the products from the exhaust gas treatment system.

9. The combination according to claim 8, wherein the fertilization system comprises a $CO_2$ distribution system inside the greenhouse and first valve means for periodically conducting treated exhaust gas to said $CO_2$ distribution system.

10. The combination according to claim 8, wherein the fertilization system comprises a fertilizer conversion system arranged to convert NOx from the exhaust gas into plant fertilizer.

11. The combination according to claim 10, wherein the fertilizer conversion system is arrranged to provide a humidified gas stream from the gas turbine exhaust gas and further including a corona discharge device arranged to convert NOx in the humidified gas stream into nitric acid and further arranged to contact the humidified gas stream with an alkaline earth compound to form an alkaline earth nitrate comprising plant fertilizer.

12. The combination according to claim 8, wherein the fertilization system comprises a fertilizer conversion system arranged to convert SOx from the exhaust gas into plant fertilizer.

13. The combination according to claim 12, wherein the fertilizer conversion system is arranged to provide a humidified gas stream by removing the SOx in a wet scrubbing unit, and arranged to react the removed SOx with an alkaline earth compound to form a plant fertilizer.

14. The combination according to claim 8, wherein the greenhouse system is located on said landfill, and the source of the fuel for the gas turbines comprises a vertical well in the landfill adjacent the greenhouse receiving LFG from the landfill.

15. The combination according to claim 8, and further including an automatic interconnection control switch connected to the generator for selectively connecting the generator either to the power consuming devices or to an external electrical grid so as to enable supply of excess power to the grid or to receive power from the grid.

16. The combination according to claim 8, wherein the power consuming devices include supplemental artificial lighting lamps for enhancing plant growth.

17. The combination according to claim 8, and further including a recuperator operatively associated with the gas turbine for increasing efficiency and second valve means for selectively by-passing the recuperator and directing hot exhaust gas to the heat exchange system for increasing heat energy supplied to the greenhouse.

18. The combination according to claim 8, and further including third valve means for selectively by-passing the heat exchange system and conducting hot exhaust gas directly to the gas treatment system.

* * * * *